C. H. GIROUX.
SYSTEM OF ELECTRICAL DISTRIBUTION.
APPLICATION FILED OCT. 2, 1920.
1,425,853.
Patented Aug. 15, 1922.
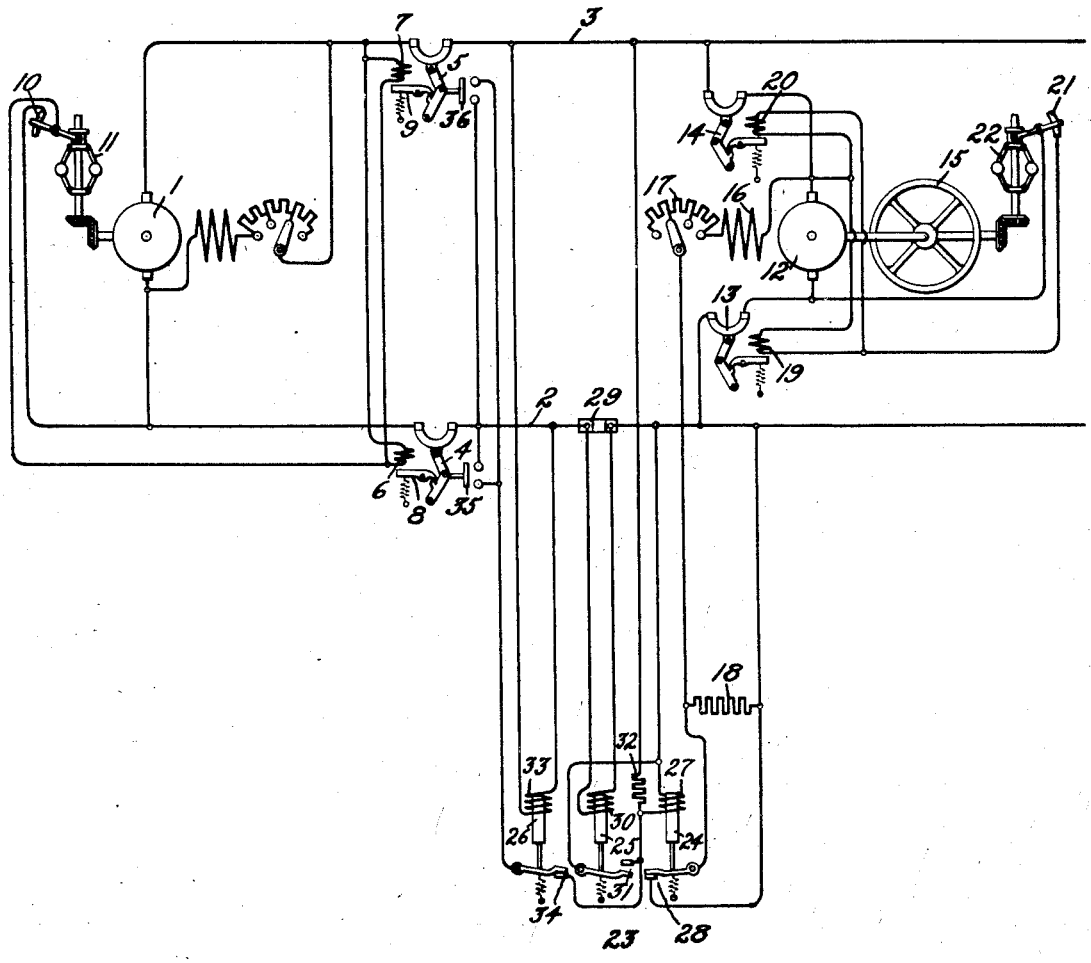
Inventor:
Carl H. Giroux,
by Albert G. Davis
His Attorney.

UNITED STATES PATENT OFFICE.

CARL H. GIROUX, OF SCHENECTADY, NEW YORK, ASSIGNOR TO GENERAL ELECTRIC COMPANY, A CORPORATION OF NEW YORK.

SYSTEM OF ELECTRICAL DISTRIBUTION.

1,425,853. Specification of Letters Patent. Patented Aug. 15, 1922.

Application filed October 2, 1920. Serial No. 414,193.

*To all whom it may concern:*

Be it known that I, CARL H. GIROUX, a citizen of the United States, residing at Schenectady, in the county of Schenectady, State of New York, have invented certain new and useful Improvements in Systems of Electrical Distribution, of which the following is a specification.

My invention relates to systems of electrical distribution.

In many electrical systems there is a fluctuation of load between very wide limits, the upper limit often exceeding for a short period of time the capacity of the generator or generators supplying the system. In systems of this sort, it has been the practice to connect across the distribution circuit a dynamo electric machine, whose rotating member has large inertia, so that it acts as a motor to store up kinetic energy when the load connected to the circuit is light and as a generator driven by such stored energy when the load connected to the circuit is heavy.

In case the generator or the prime mover driving the generator fails, it is also desirable in many instances that the system be supplied with electrical energy for a certain length of time after the failure so that the system will be energized until the cause of the failure is remedied or some other source of energy is connected to the system.

It is an object of my invention to provide in the system of the sort referred to, an arrangement whereby a dynamo electric machine, whose rotating member has large inertia, supplies the current in excess of a predetermined value when a load greater than the capacity of the generator is connected to the distribution circuit, and supplies all the current to said circuit at a predetermined voltage for a certain interval of time, in case the main source fails. In carrying out my invention, I provide an arrangement whereby the field of the dynamo electric machine, whose rotating member has large inertia, is controlled in accordance with the current supplied by the main source as long as the main source continues to supply current to the system and is controlled in accordance with the voltage of the system when the main source fails.

My invention will be better understood from the following description taken in connection with the accompanying drawing, and its scope will be pointed out in the appended claims.

Referring to the drawing, which illustrates one embodiment of my invention, 1 represents a generator of any suitable type driven by any suitable prime mover (not shown). The generator 1 may be excited and regulated in any desired manner, preferably to give a constant voltage. In the arrangement shown the generator 1 is connected to a distribution circuit 2—3 by means of circuit breakers 4 and 5. The circuit breakers 4 and 5 are provided with low voltage coils 6 and 7, which, when energized, hold the latches 8 and 9 in their operative positions so as to keep the circuit breakers in their closed position. The low voltage coils 6 and 7 are connected across the distribution circuit 2—3 by means of the contacts 10 of a speed responsive device 11 which is connected to the movable element of the generator 1. The speed responsive device 11 is adapted to open its contacts 10 when the speed of the generator drops below a predetermined value thereby interrupting the circuits of the coils 6 and 7 and causing the circuit breakers 4 and 5 to open.

12 represents a dynamo electric machine which has its armature connected across the circuit 2—3 by means of circuit breakers 13 and 14. To the shaft of this machine 12 is connected a fly-wheel 15. The dynamo electric machine 12 is also provided with a field winding 16 which may be energized in any desirable manner. In the arrangement shown, the field winding is connected in series with the resistances 17 and 18 across the circuit 2—3. The resistance 17 is provided so that the field strength of the dynamo electric machine 12 can be adjusted manually to give the best results when working in conjunction with the automatic devices described below. After resistance 17 has once been adjusted it is not necessary to again adjust it to obtain any or all of the results described herein. The circuit breakers 13 and 14 are provided with low voltage coils 19 and 20 respectively, which are adapted to be connected across the circuit 2—3 by means of contacts 21 of a speed responsive device 22 connected to the rotating element of the dynamo electric machine 12. The speed responsive device 22 is adapted to open the contacts 21 when the speed of the machine 12 exceeds a predetermined value.

In order to control the field strength of the dynamo electric machine 12 so that it acts as a motor to store energy in the fly-wheel 15 when the load on the generator 1 is light and acts as a generator, driven by the fly-wheel 15, to supply current to the distribution circuit 2—3 when the load on the generator exceeds a predetermined value, and when the generator 1 fails, I provide the regulator 23 comprising the relays 24, 25 and 26. The relay 24 is provided with a coil 27 which is connected across the distribution circuit 2—3 in series with resistance 32. This coil 27 is so designed that the normal voltage across the distribution circuit 2—3 is sufficient to cause the relay to open its contact 28, thereby opening a short-circuit around the resistance 18. The relay 25 is provided with a coil 30 which is connected to a resistance shunt 29 in the distribution circuit between the circuit breaker 4 and the point where the dynamo electric machine 12 is connected to the distribution circuit. This coil 25 is so designed that when the current flowing through the resistance shunt 29 exceeds a predetermined value, the relay closes its contacts 31, thereby completing a short-circuit around the coil 27 of the relay 24. Contacts 28 of the relay 24 then close and complete a short-circuit around the resistance 18. In order to prevent a short-circuit from being completed across the distribution circuit 2—3 when relay 25 closes its contacts 31, the resistance 32 is provided in the circuit of the coil of relay 24. The relay 26 is provided with a coil 33 which is connected across the distribution circuit and is so designed that when the voltage impressed across the terminals thereof exceeds a predetermined value the relay opens its contacts 34. The contacts 34 are included in a circuit with the contacts of switches 35 and 36 which are connected to the circuit-breakers 4 and 5 respectively. When the contacts 34 and either switch 35 or switch 36 are closed, a short-circuit around the coil 27 is completed.

The operation of my invention is as follows: Let it be assumed that the circuit breakers 4, 5, 13 and 14 are closed, the dynamo electric machine 12 is running and the generator 1 is supplying current to the distribution circuit 2—3 at a predetermined voltage. When the load on the distribution circuit 2—3 is light, the relay 24 of the regulator 23 is energized and the contacts 28 thereof are open, so that the resistance 18 is connected in series with the field winding 16 of the dynamo electric machine 12. Consequently, the dynamo electric machine 12 runs as a motor to store energy in the fly-wheel 15. When the load increases to such a value that the current flowing through the resistance shunt 29 exceeds a predetermined value, the increased energization of the coil 30 causes the relay to close its contacts 31 thereby short-circuiting the coil 27 of the relay 24. Contacts 28 of the relay 24 then close and complete a short-circuit around the resistance 18 whereupon the excitation of the machine 12 is increased. This increase in the field strength produces an increase in the electromotive force generated in the armature winding of the machine 12 so that the machine 12 now acts as a generator driven by the fly-wheel 15 and supplies current to the distribution circuit 2—3 thereby decreasing the load on the generator 1 and the current through the resistance shunt 29. When the current through the resistance shunt 29 decreases below the predetermined value above referred to, the contacts 31 open, thereby opening the short-circuit around the coil 27 of the relay 24. The coil 27 then becomes energized again and the contacts 28 are opened, thereby opening the short-circuit around the resistance 18. The field current of the dynamo electric machine 12 is thereby decreased and the machine operates as a motor to store up kinetic energy in the fly-wheel.

While I have described only one cycle of this operation of the regulator, it will be evident that as long as the load on the distribution circuit 2—3 exceeds the predetermined value above referred to the movable contacts of the relays 24 and 25 will be in rapid vibration, thereby controlling the excitation of the dynamo electric machine 12 so that the load carried by the generator 1 remains substantially constant and the dynamo electric machine 12 supplies the rest of the load connected to the distribution circuit.

In case something happens to the generator 1 or to the prime mover driving it so that the voltage of the generator drops below a predetermined value, or the speed thereof drops below a predetermined value, the low voltage coils 6 and 7 of the circuit breakers 4 and 5 become deenergized thereby opening the circuit breakers and disconnecting the generator 1 from the distribution circuit 2—3. The opening of the circuit breakers 4 and 5 closes the switches 35 and 36 so that whenever the voltage across the circuit 2—3 drops below a predetermined value, and relay 26 closes its contacts 34, a short-circuit is completed around the coil 27 of the relay 24. Relay 24 then closes its contacts 28 whereupon the voltage developed in the armature winding of the machine 12 is increased so as to restore the voltage across the distribution circuit 2—3 to its predetermined value. Since none of the load current flows through the resistance shunt 29 at this time, it is apparent that the excitation of the dynamo electric machine 12 is now controlled so as to maintain the voltage across the distribution circuit 2—3 at a predetermined value. This value of voltage will be held constant until the speed of the dynamo electric machine 12, has fallen below the point where the resistance 18 becomes permanently short-circuited by contacts 28. Therefore, it will be observed that I have provided an arrangement whereby the system is supplied with electric energy at a constant potential for a short time after the generator 1 fails.

In order to prevent the motor reaching an excessive speed due to the field winding being accidentally weakened to a very low value, I provide the speed responsive device 22, whereby the circuit breakers, 13 and 14 are opened when the speed of the machine exceeds a predetermined value.

While I have shown and described only one embodiment of my invention, many modifications thereof may be made without departing from the spirit and scope of my invention and I desire to cover all such modifications in the appended claims.

What I claim as new and desire to secure by Letters Patent of the United States, is:—

1. In combination, a source of electrical energy, a circuit supplied thereby, means for disconnecting said source from said circuit, a dynamo electric machine whose rotating member has large inertia electrically connected to said circuit, and a voltage regulator controlled by said disconnecting means and arranged to cause said dynamo electric machine to supply power to said circuit at a predetermined voltage when said source is disconnected from said circuit.

2. In combination, a source of electrical energy, a circuit supplied thereby, means for disconnecting said source from said circuit, a dynamo electric machine whose rotating member has large inertia electrically connected to said circuit, means for causing said dynamo electric machine to assume the distribution circuit load in excess of a predetermined value, and means for causing said dynamo electric machine to supply power to said circuit at a predetermined voltage when said source is disconnected from said circuit.

3. In combination, a source of electrical energy, a circuit supplied thereby, means for disconnecting said source from said circuit, a dynamo electric machine whose rotating member has large inertia electrically connected to said circuit, a field winding for said dynamo electric machine, and means for varying the excitation of said field winding in accordance with one electrical condition of said circuit while said source is supplying current thereto, and for varying the excitation of said field winding in accordance with a different electrical condition of said circuit while said source is not supplying current thereto.

4. In combination, a source of electrical energy, a circuit supplied thereby, means for disconnecting said source from said circuit, a dynamo electric machine whose rotating member has large inertia electrically connected to said circuit, a field winding for said dynamo electric machine, and means for varying the excitation of said field winding in accordance with the current in said circuit while said source is supplying current thereto and for varying the excitation of said field winding in accordance with the voltage of said circuit while said source is not supplying current thereto.

5. In combination, a source of electrical energy, a circuit supplied thereby, means for disconnecting said source from said circuit, a dynamo electric machine whose rotating member has large inertia electrically connected to said circuit, a field winding for said dynamo electric machine, a resistance in the circuit of said field winding, and a regulator for controlling the excitation of said field winding, said regulator comprising a relay controlling a short circuit around said resistance, a second relay energized in accordance with the current flowing between said source and said circuit and arranged to control the operation of said first mentioned relay, and a third relay energized in accordance with the voltage of said circuit and arranged to control the operation of said first mentioned field winding when said source is disconnected from said circuit.

In witness whereof, I have hereunto set my hand this 1st day of October, 1920.

CARL H. GIROUX.